United States Patent [19]

Rishel et al.

[11] Patent Number: 4,836,922
[45] Date of Patent: Jun. 6, 1989

[54] VIBRATING FILTER APPARATUS

[75] Inventors: John W. Rishel, Vicksburg; George H. Schrink, Portage, both of Mich.

[73] Assignee: Delaware Capital Formation, Inc., Wilmington, Del.

[21] Appl. No.: 84,644

[22] Filed: Aug. 12, 1987

[51] Int. Cl.$^4$ .................. B01D 29/28; B01D 35/20
[52] U.S. Cl. .................. 210/232; 210/332; 210/388; 210/785
[58] Field of Search ............ 210/785, 232, 237, 238, 210/323.2, 332, 388, 407; 55/292, 293, 304

[56] References Cited

U.S. PATENT DOCUMENTS

| | | | |
|---|---|---|---|
| 2,167,236 | 7/1939 | Giesler | 210/388 |
| 3,747,765 | 7/1973 | Nowak | 210/238 |
| 3,870,640 | 3/1975 | Reece | 210/388 |
| 4,289,630 | 9/1981 | Schmidt, Jr. et al. | 210/785 |

FOREIGN PATENT DOCUMENTS 210213  6/1984  German Democratic Rep. .................. 210/785

*Primary Examiner*—Richard V. Fisher
*Assistant Examiner*—Linda S. Evans
*Attorney, Agent, or Firm*—Flynn, Thiel, Boutell & Tanis

[57] ABSTRACT

A vibrating filter apparatus comprises a housing, a filter unit in the housing and a support unit for supporting the filter unit in the housing. The support unit includes elongate elements in the housing connecting the filter unit in spaced relation to the wall of the housing, and a vibrator unit fixed to the support unit between the housing wall and filter unit and actuable for laterally vibrating the support unit and thereby the filter unit.

6 Claims, 3 Drawing Sheets

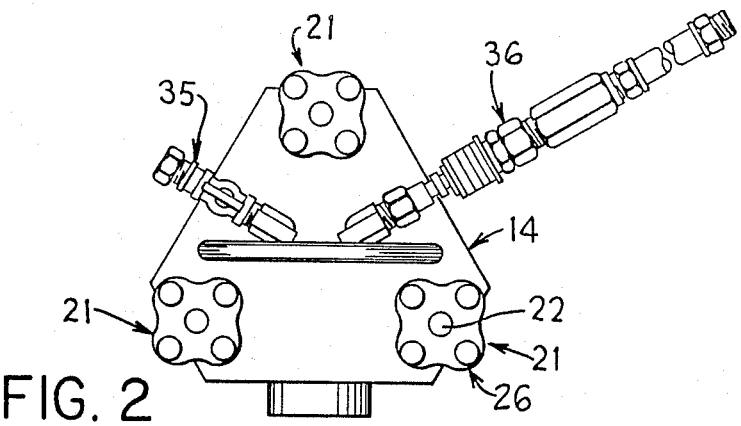
FIG. 2
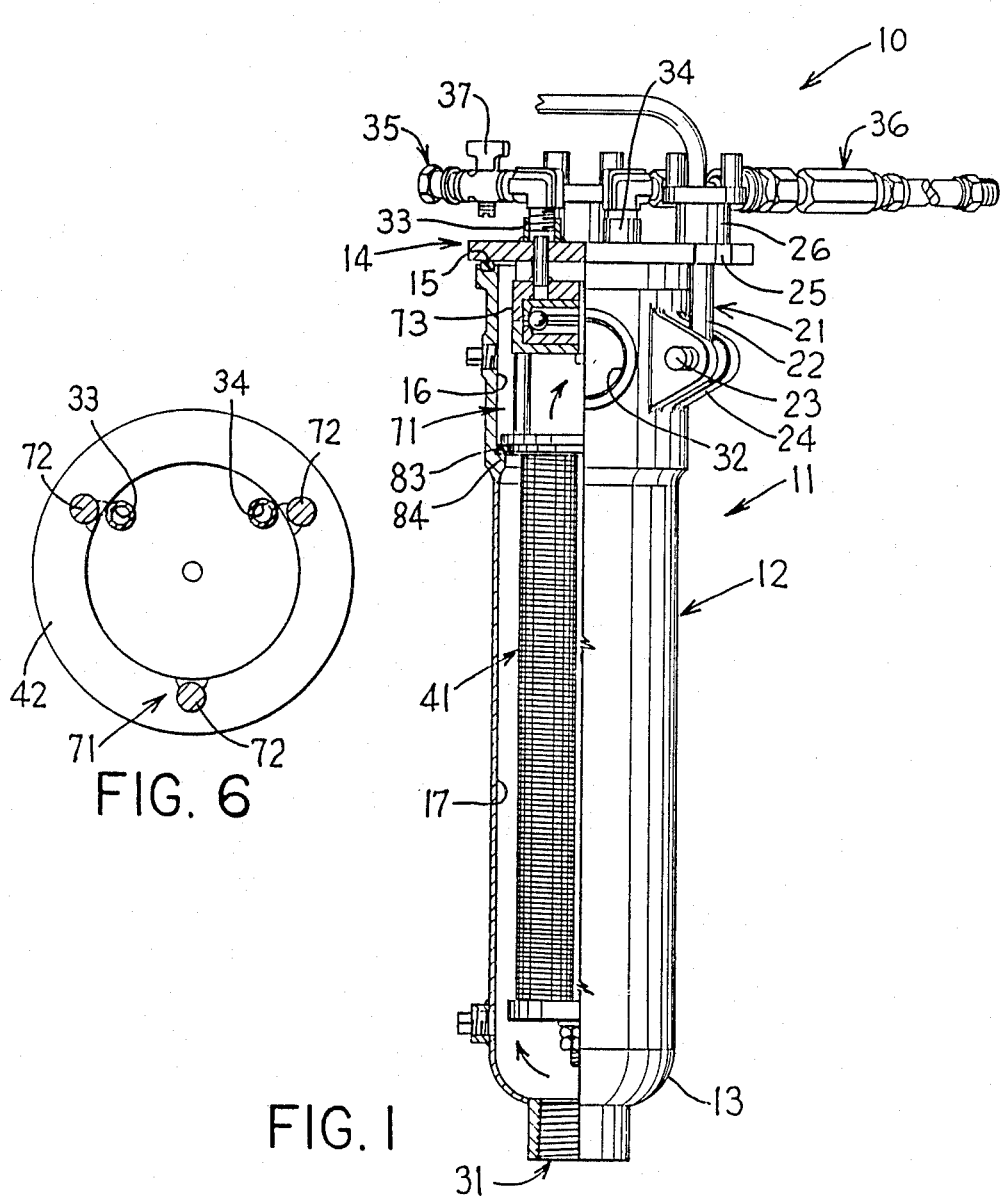
FIG. 6
FIG. 1

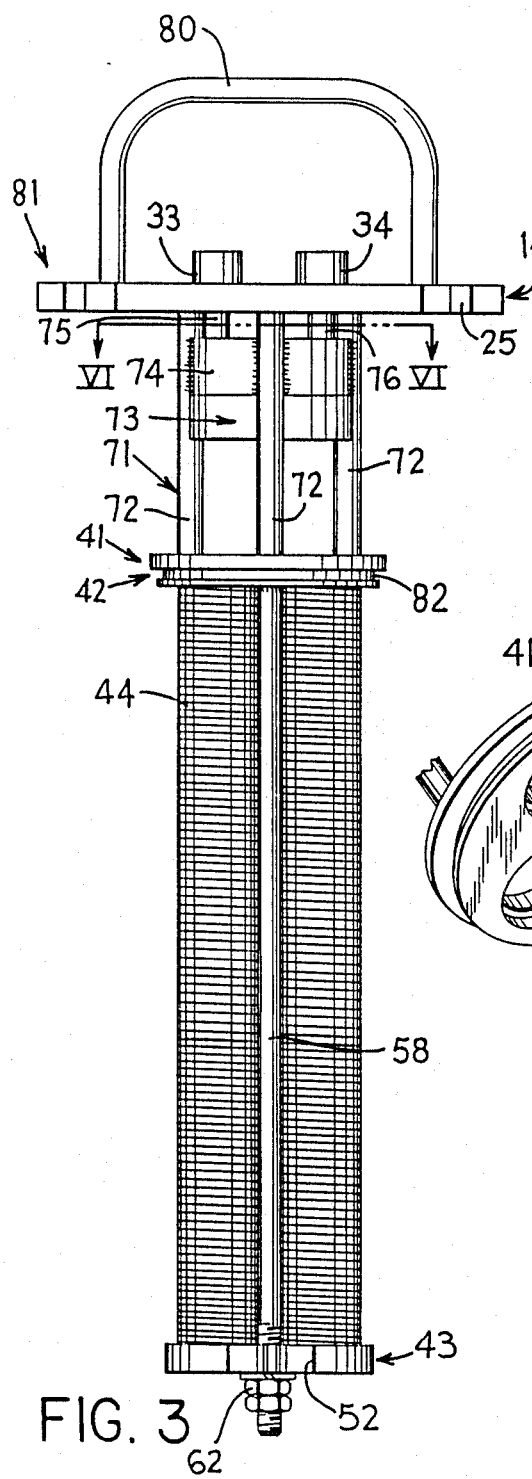
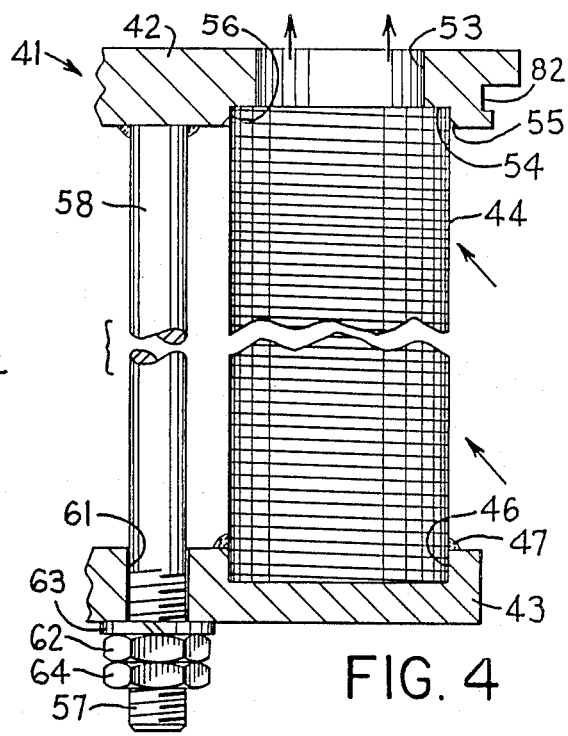
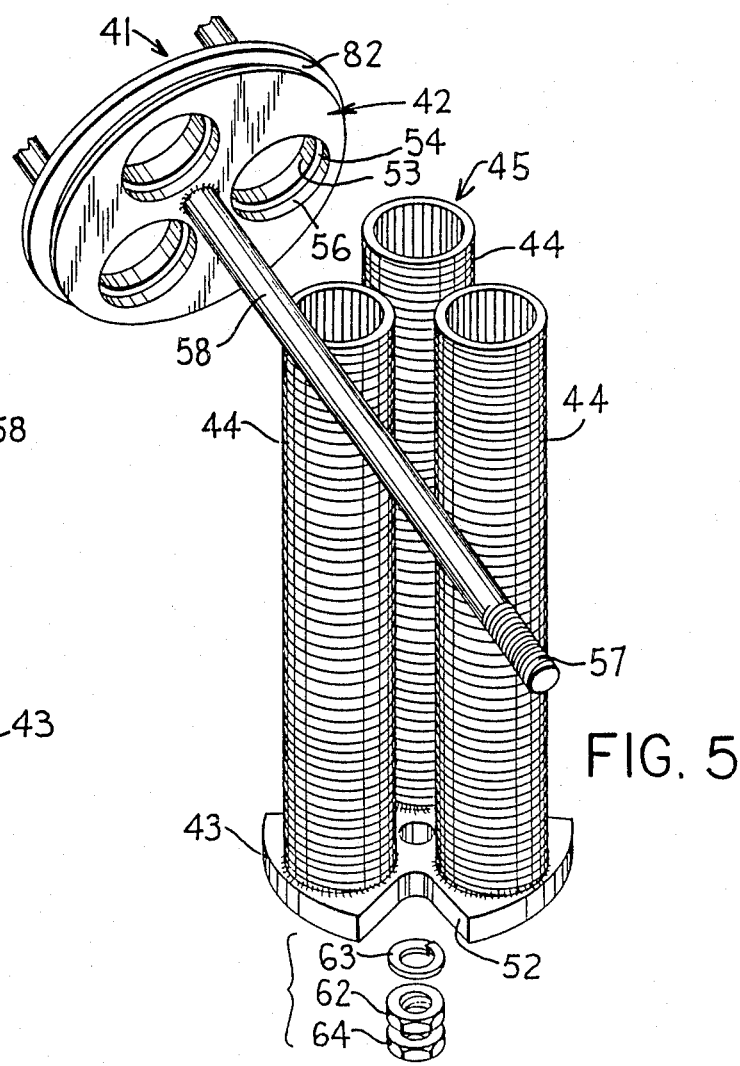
FIG. 3
FIG. 4
FIG. 5

VIBRATING FILTER APPARATUS

FIELD OF THE INVENTION

This invention relates to a vibrating filter of the kind having a filter element and a vibrator disposed within a filter housing.

BACKGROUND OF THE INVENTION

U.S. Pat. No. 3,692,178, assigned to the assignee of the present invention, shows a filter apparatus of the industrial, pressure liquid filtering type in which a compressed air powered vibrator depends by means of an input line and output line within a filter housing. The input line supplies an output line exhaust air with respect to said vibrator for causing same to vibrate, such lines extending axially in the housing along and adjacent to the filter element therein. Vibration of the vibrator and the air supply and exhaust lines thereof serves primarily to agitate the process liquid within such housing to be filtered, to reduce the tendency of solids in such process liquid to coat the filter element and thereby lead to premature clogging thereof.

Later U.S. Pat. No. 3,870,640, also assigned to the assignee of the present invention, shows a later development in which the vibrator is fixed to the bottom end of the filter element. The filter element depends from its top end which is fixedly supported within the filter housing. In this instance, the vibrator actually vibrates the filter element to which it is attached and thereby is intended to further reduce the tendency of solids in the process liquid surrounding the filter element to cake on and block the filter element.

However, testing of the latter apparatus has shown that the vibrator tends to laterally vibrate the bottom end of the filter element to a substantially greater amplitude than the top end of the filter element.

This is not a significant problem where the length of the filter element is relatively great. However, it becomes more of a problem where the length of the filter element is reduced. For example, the greater amplitude of vibration at the bottom end of the filter element may cause fatigue, stress and eventual structural damage at the top or bottom of such a filter element of reduced length. As a further example, coating by sticky process liquid impurities may tend to extend from the fixed top down over a greater portion of the length of the fiber element when the filter element length is reduced.

Accordingly, the objects and purposes of this invention include providing an improved vibrating filter apparatus in which vibration is applied to the end of the filter element which is attached to the housing, in which the lateral amplitude of vibration is substantially uniform from the top to the bottom of the filter element, in which there is a reduction of fatigue stress and coating at the top of filter elements and particularly reduced length filter elements and which is particularly adapted (but not limited) to use with filter elements of relatively short axial length, intended to be used in relatively compact spaces, and which are usable for example as a vibrating paint filter.

Accordingly, the objects and purposes of this invention include provision of a vibrating filter apparatus comprising a housing, filter element means in a housing, support means for supporting said filter element means in the housing, the support means including an elongate means in the housing connecting the filter element means in spaced relation to a wall of the housing, and vibrator means fixed to the support means between the housing wall and filter element means and actuable for vibrating the support means and thereby the filter element means.

Further objects and purposes of the invention will be apparent to persons acquainted with apparatus of this general type upon reading the present specification and inspecting the accompanying drawings.

IN THE DRAWINGS

FIG. 1 is an elevational view of a filter apparatus embodying the invention with the wall of the housing partially broken away in central section to show the internal structure therein;

FIG. 2 is a top view of the FIG. 1 apparatus;

FIG. 3 is an enlarged elevational view of the FIG. 1 apparatus with the housing removed to show entirely the internal structure;

FIG. 4 is an enlarged, fragmentary, central cross sectional view of the FIG. 3 apparatus, particularly showing a filter element, associated top and bottom plates, and an elongate fastening member for securing same together;

FIG. 5 is a fragmentary exploded pictorial view showing the filter unit of FIGS. 3 and 4 with the top plate and elongate fastening member removed to leave a secondary air cartridge comprising a bottom plate and three filter elements fixed thereto; and FIG. 6 is a sectional view substantially taken on the line VI—VI on FIG. 3.

DETAILED DESCRIPTION

Figure 7B:
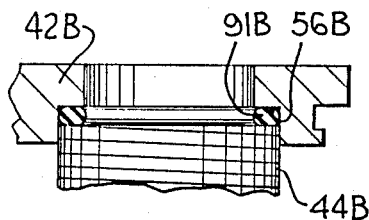
FIGS. 7A and 7B are similar fragmentary cross-sectional views corresponding to the top portion of FIG. 4, but showing modifications involving addition of a seal ring between the top portion of each filter element and the top plate.

A vibrating filter apparatus 10 (FIG. 1) comprises a housing 11. The housing 11 includes a generally tubular side wall 12 and a bottom wall 13. The open top of the housing 11 is selectively closable by a cover 14. A resilient annular seal (e.g. an O-ring) 15 is suitably interposed between the cover 14 and the top edge of the housing side wall 12. The housing 11 has an upper chamber 16 and a lower chamber 17 enclosed by wall means namely by said side wall 12, bottom wall 13 and cover 14.

The cover 14 is releasably held in place to seal the top of the housing 11 by any convenient means, here for example conventional threaded pivot toggles 21 (FIGS. 1 and 2). Each toggle 21 comprises an eye bolt 22 pivoted at its lower end by means of a horizontal pivot pin 23 on a boss 24 protruding sidewardly from the top portion of the housing tubular side wall 12. The upper end of the eye bolt 22 is threaded and is pivotable upwardly into a slot 25 in the overhanging edge of the cover 14 to protrude upwardly therebeyond and threadedly receive on the upper end thereof a hand nut 26. Three similar toggles 21 are evenly circumferentially distributed with respect to the apparatus 10. Tightening of the three hand nuts 26 downwardly onto the top of the cover 14 snugly secures the cover 14 downward against the seal 15 and hence fixedly closes the upper end of chamber 16. In each toggle 21, loosening of the nut 26 to a sufficient extent allows the eye bolt 22 to pivot radially outward about its pivot pin 23 and clear the slot 25. Doing so with each of the three toggles 21 allows the cover 14 to be lifted from the housing 11 for access to the interior of the latter.

A process liquid inlet 31 communicates through the bottom wall 13 of the housing 12 into the lower chamber 17 and a filtered liquid outlet 32 opens through the upper portion of the tubular side wall 12 into the upper chamber 16. The inlet 31 and outlet 32 are connectable in a liquid system (not shown) for filtering process liquid in a conventional manner.

Vibrator energy connections, typically compressed gas (such as air) inlet and outlet stubs 34 and 33 are fixed atop, and open downward through, the cover 14 for releasable (typically threaded) connection to a compressed air supply connection 36 and an air exhaust connection, 35 (valved at 37), for energization of a vibrator hereafter described.

A filter unit 41 (FIGS. 1 and 3–5) comprises a top plate 42 (FIGS. 3–5), a bottom plate 43 and at least one filter element 44. In the preferred embodiment shown, an array of three such filter elements 44 is provided, the filter elements extending vertically, and being circumferentially spaced around the center of the plates 42 and 43 at the apices of an equilateral triangle. By providing more than one filter element 44 it is possible to increase the surface area available for filtering without increasing the overall diameter of the filter unit, and an array of three such filter elements 44 has been found to be a particularly effective number. The spacing of the three filter elements 44 from each other permits process liquid to move between the filter elements and hence allows all the surfaces of the filter elements to conduct and carry out effective filtering. Such a triangular array of three filter elements has been known, the assignee of the present application having manufactured same under the trademark TRI-CLUSTER for a number of years.

The top plate 42, bottom plate 43 and filter elements 44 are secured rigidly together by means hereafter described to define the filter unit 41. In the preferred embodiment shown, the filter elements 44 and bottom plate 43 define a one piece secondary cartridge 45 (FIG. 5) detachable as a unit from the top plate 42 for exchanging filter elements 44 of different characteristics in a rapid manner while minimizing the need for large inventories of parts. To this end, the filter elements 44 are socketed in respective pockets 46 in the top of the bottom plate 43 and are fixed therein, as by welding it 47. Accordingly, secondary cartridges 45 of similar or different filtering characteristics can be substituted for each other as desired.

To maximize process liquid flow to the lower end portion of the filter elements 44, the bottom plate 43 is notched between filter elements, as indicated at 52.

The secondary cartridge 45 is jointed to the top plate 42, to complete the filter unit 41, as follows. In the preferred embodiment shown, openings 53 (FIG. 4) through the top plate 42 are aligned coaxially with respective ones of the upper ends of the filter elements 44 and are stepped at 54 to form downwardly opening recesses 56, which recesses are chamfered at 55 to facilitate reception of the upper end of the filter elements 44 in the recesses 56.

To releasably but fixedly secure the top plate 42 snugly atop the filter elements 44, a central elongate rod 58 is welded to the underside of the top plate 42 and depends therefrom. The bottom end of the rod 58 is threaded at 57 and extends through a central hole 61 through the bottom plate 43. A nut 62 threads on the bottom end of the rod 58 for pressing the bottom plate 43 upward and hence pressing the tops of the filter elements 44 against the downward facing steps 54 in the top plate 42, thus making a rigid but disassemblable filter unit 41. In the preferred embodiment shown, the nut 62 is flanked by a lock washer 63 and lock nut 64 to avoid inadvertent loosening of the nut 62 during vibrating filtration. Alternately, the nut 62 may be a lock nut. It will be noted from FIG. 4 that the rod 58 is spaced from all of the filter elements 44 and so does not block any of the filtration surface of the latter.

A vibrator-support unit 71 fixes the top plate 42 of the filter unit 41 in spaced, centered relation below the cover 14. The vibrator-support unit 71 comprises a plurality, here three, of support rods 72 fixedly secured at their ends (here by welding) to the underside of the cover 14 and to the top of the top plate 42. The support rods 72 are evenly and widely circumferentially spaced from each other and define the apices of an equilateral triangle. The support rods 72 are spaced close to the periphery of the top plate 42. Thus, sufficient space is provided in the central area between the support rods 72 for receiving a vibrator. The vibrator 73 has an outer casing 74 fixed, here by welding, to the opposed faces of the support rods 72. The vibrator 73, is spaced from the cover 14 and top plate 42. In the embodiment shown, the vibrator 73 is spaced closer to the cover 14 than to the top plate 42, to minimize the length of compressed air supply and exhaust tubes 75 and 76 which connect from the top of the vibrator 73 through openings in the top plate 14 to the air supply and exhaust stubs 34 and 33 respectively. In the embodiment shown, the length of the support rods 72 is more than twice the vertical height of the vibrator 73. While vibrators of various types are contemplated, it is preferred that the vibrator 73 be of the type having a heavy orbiting ball which is driven by compressed air flow through to the vibrator housing 74 in a conventional manner. This is the type of vibrator disclosed for example in above-mentioned prior U.S. Pat. No. 3,870,640 of the assignee of the present invention.

The vibrator-support unit 71 fixedly connects the cover 14 to the top plate 42 of the filtering unit 41 and therewith forms a master cartridge 81 (FIG. 3) insertable as a unit into the top of the filter housing 11. The master cartridge 81 further includes a handle 80 fixed to and upstanding from the cover 14 to facilitate insertion of the master cartridge 81 into the open top of the housing 11 and removal of the master cartridge 81 from the housing 11. It is possible to change master cartridges 81 with respect to a given filter housing 11 by disconnecting the compressed air and exhaust connections 35 and 36 in a conventional manner. Such may be done for purposes of substituting a new master cartridge 81 and/or other purposes as may be required.

To prevent or eliminate leakage between the upper and lower chambers 16 and 17, the perimeter of the top plate 42 is preferably grooved at 82 (FIG. 4) to receive a suitable annular seal, such as a resilient O-ring 83 (FIG. 1). The groove 82 opens radially outwardly and downwardly to expose the O-ring 83. An upward facing step, or ledge, 84 rings the interior wall surface of the housing side wall 12 between the upper chamber 16 and lower chamber 17 and acts as a slat to receive the O-ring 83 thereon.

Vibration of the vibrator 73 imparts lateral motion to the master cartridge 81. However, when the apparatus is assembled, the master cartridge 81 is fixed to the top of the housing 11 by the toggles 21. Because of the fixed location and substantial mass of the housing 11 and cover 14, same do not tend to vibrate in response to operation of the vibrator 73. Instead, Applicant has found that operation of the vibrator 73 causes lateral vibration of the filter unit 41 and hence the filter elements 44 thereof, with the lateral amplitude of vibration being relatively uniform from top to bottom of the filter elements 44. In other words, the vibration of the filter elements is at an amplitude substantially constant along the length of the filter elements. Such is understood to be caused by transfer of vibration of the vibrator 73 through the lower portions of the support rods 72 to the top plate 42 and hence the remaining portions of the filter unit 41. The uniformity of the lateral vibratory motion from top to bottom of the filter elements 44 is advantageous since it tends to help prevent premature coating of the exterior surfaces of the filter elements 44, not only at the bottom thereof, but also substantially uniformly through the middle and top portions thereof as well.

OPERATION

The operation of the apparatus will be apparent from the above description but will be briefly summarized below for convenience.

To assemble the apparatus, a secondary cartridge 45 (FIG. 5) having filter elements 44 of desired filtration characteristics is assembled to the top plate 42 and rod 58 to form a filter unit 41. The top plate 42 is part of the master cartridge 81 which further comprises the support unit 71 and cover 14. With the seal 15 in place atop the housing side wall 12, and the seal 83 in place on the periphery of the top plate 42, the master cartridge 81 is inserted downward into the open top housing 11. The cover 14 is then clamped tightly atop the housing 11 by the toggles 21. The seal 83 helps laterally locate the master cartridge 81 with respect to the interior of the housing 11 and segregate the liquids in the upper and lower chambers 16 and 17. However, the seal 83 has sufficient resilience as not to significantly damp vibration imparted to the top plate 42 and filter elements 44 by operation of the vibrator 73.

With the compressed air supply and exhaust connections 35 and 36 secured at the stubs 33 and 34, and the valve 37 in the compressed air connection 35 opened, the vibrator 73 is actuated. Its vibration is transmitted through the support rods 72 to the top plate 42 and thence to the filter elements 44. The feeding of process liquid through the inlet 31 to the lower chamber 17 brings such liquid in contact with the outside of the filter elements 44. Pressure on the incoming process liquid causes an output of filtered liquid from the filtered liquid outlet 32.

Disassembly of the apparatus for replacement of parts therein, such as the master cartridge 81 and/or secondary cartridge 45, may be carried out by reversal of the above set forth assembly steps.

MODIFICATIONS

Figure 7A:
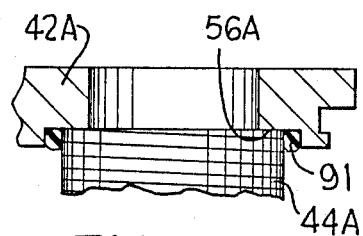
Figure 8:
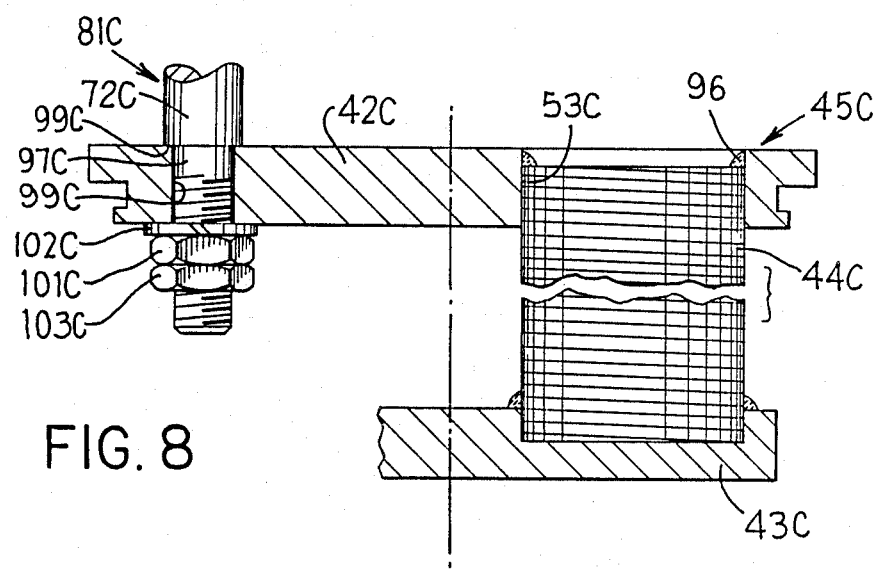
FIG. 8 is a fragmentary sectional view corresponding to FIG. 4, but showing a modified master cartridge.

In FIGS. 7A, 7B and 8, structural elements corresponding to those in the FIGS. 1-6 embodiment shall carry the same reference numerals thereas, but with the added suffix A, B, or C, respectively.

The modified embodiment of FIG. 7A is similar to the 1-6 embodiment above described in detail, except that a resilient seal ring 91 is interposed between the upper end portion of each filter element 44A and the surface of the recess 56A in the top plate 42A. In FIG. 7A, the seal ring 91 circumferentially surrounds the top portion of the filter element 44A and the recess 56A is correspondingly enlarged in diameter to snugly receive the seal ring 91.

The FIG. 7B modification is similar to that of 7A except that the resilient seal ring 91B is axially interposed between the top edge of the filter element 44B and the recess 56B in the top plate 42B.

Although the resilient seal ring 91 or 91B is shown as being of circular cross section, other conventional cross sectional shapes are contemplated. For example, it is contemplated that the seal ring may be L-shaped to engage both the sidewall and end surface of the filter element to in effect combine the sealing effects of FIGS. 7A and 7B.

Interposition of a resilient seal between the filter element and the top plate permits substantially complete sealing between the unfiltered process liquid and the filtered liquid for installations where (1) complete sealing is required and (2) the three filter elements may differ in length so as not to all snugly axially abut the top plate. The seals (for example seal 91 or 91B) are arranged so as not to materially interfere with vibration of the filter elements 44A by the vibrator (seen at 73 in FIG. 3).

The FIG. 8 embodiment is similar to the above-described FIGS. 1-6 embodiment except as follows. In FIG. 8 a structurally different secondary cartridge 45C is provided. More particularly, the FIGS. 1-6 rod 58 is eliminated as is the releasable connection between the top plate 42 and the tops of the filter elements 44 of the FIGS. 1-6 embodiment. Instead, in FIG. 8 the top plate 42C has an unrecessed opening 53C coaxial with each filter element 44C and into which the top portion of such filter element 44C is partially telescoped. The top portion of the opening 53C extends somewhat (for example about $\frac{3}{8}''$) above the top of the corresponding filter element 44C to define a fillet for receiving a weld bead 96 circumferentially continuously securing and sealing the top of the filter element 44C with respect to the top plate 42C. The top plate 42C and bottom plate 43C are thus rigidly joined by the plural filter elements 44C welded thereto.

The central hole 61 of FIG. 4 is no longer needed and can be eliminated.

The top plate 42C, bottom plate 43C and plural (here 3) filter elements 44C thus define a one piece replaceable secondary cartridge 45C.

The secondary cartridge 45C is releasably securable to the remainder of the master cartridge, a fragment of which is indicated at 81C. More particularly, the three support rods 72C have top portions of which are welded to a vibrator and cover, as respectfully indicated at 73 and 14 in FIG. 3. In the FIG. 8 embodiment however, the bottoms of the support rods 72C are not welded to the top plate 42C of the secondary cartridge 45C but instead have reduced diameter threaded lower ends 97C which pass snugly but slidably down through holes 98C in the top plate 42C. A step 99C faces downward and rests atop the top plate 42C where the reduced diameter lower end 97C joins the remainder of the corresponding support rod 72C. A nut 101C, here cooperating with a lock washer 102C and lock nut 103C, engages the bottom of the lower end 97C below the top plate 42C to rigidly but releasably fix the top plate 42C dependently from the rods and thereby secure the secondary cartridge 45C to the vibrator and cover (seen respectively at 73 and 14 in FIG. 3) and thereby impart vibration from the vibrator 73 to the several filter elements 44C in the manner above described with respect to the FIGS. 1-6 embodiment. Instead of the nut 101C, lock washer 102C and lock nut 103C, other fastening means such as a lock nut may be used.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A vibrating filter apparatus for liquids containing sticky particles, including paint, comprising:
   a housing having a removable cover at one end, an upper chamber closed by said cover, a lower chamber, a seat between said chambers, and upper and lower flow ports respectively communicating with said upper and lower chambers;
   a filter unit comprising a top plate, a bottom plate, at least one filter element disposed between said top plate and said bottom plate and means fixing together said top plate, said bottom plate and said filter element;
   means supporting said top plate on said seat, said filter element being received in said lower chamber;
   means for locating said filter element in said lower chamber and means for laterally vibrating said filter element at an amplitude which is substantially constant along the length of said filter element, said means for laterally vibrating said filter element comprising
   (1) a plurality of support rods fixed to and depending from said cover into said housing upper chamber and circumferentially distributed around a central space, said filter unit top plate being fixed to and depending from said support rods to support said filter unit therefrom within said housing, and
   (2) means for laterally vibrating said support rods and said filter unit top plate depending therefrom, said means for laterally vibrating comprising a generally cylindrical vibrator laterally centered within said central space so as to be surrounded by said plurality of support rods and fixedly interconnect the same, said vibrator being axially spaced below said cover and above said filter unit top plate so that said vibrator laterally vibrates said rods and thereby said filter unit with respect to said cover,
   (3) energizing means connecting through said cover to said vibrator to energize said vibrator.

2. The apparatus of claim 1 in which said means fixing together said top plate, said bottom plate and said filter element comprises a weld-like connection of the top plate and the bottom plate to respective ends of the filter element to form a one piece secondary cartridge, including releasable fastening means (1) for affixing the bottoms of said support rods to said filter unit top plate and (2) actuable for effecting said fixed dependence of said filter unit top plate from said support rods.

3. The apparatus of claim 1 in which said vibrator is a pressure fluid driven, mechanical vibrator with a laterally moving vibratory element, said energizing means comprising pressure fluid supply and exhaust conduits connected through said cover to said vibrator.

4. The apparatus of claim 1 in which said vibrator is of pressurized air powered, eccentric ball type having a generally cylindrical casing caged by and touching the inner sidewalls of all of said support rods to laterally vibrate same, said support rods being three in number and arranged in a triangular array laterally around said vibrator casing.

5. The apparatus of claim 1 in which said cover, said rods, said vibrator, said energizing means and said filter unit form a primary cartridge removable as a unit from said housing.

6. The apparatus of claim 5 in which said vibrator is of pressurized air powered, eccentric ball type having a generally cylindrical casing caged by and touching the inner sidewalls of all of said support rods to laterally vibrate same, said support rods being three in number and arranged in a triangular array laterally around said vibrator casing.

* * * * *